United States Patent
Meenal Kathiresan

(10) Patent No.: US 12,339,765 B2
(45) Date of Patent: Jun. 24, 2025

(54) SENTIMENT ANALYSIS USING MAGNITUDE OF ENTITIES

(71) Applicant: Accenture Global Solutions Limited, Dublin (IE)

(72) Inventor: Revathi Meenal Kathiresan, Madurai (IN)

(73) Assignee: Accenture Global Solutions Limited, Dublin (IE)

( * ) Notice: Subject to any disclaimer, the term of this patent is extended or adjusted under 35 U.S.C. 154(b) by 173 days.

(21) Appl. No.: 17/941,003

(22) Filed: Sep. 8, 2022

(65) Prior Publication Data
US 2024/0086311 A1    Mar. 14, 2024

(51) Int. Cl.
| | | |
|---|---|---|
| G06F 9/44 | (2018.01) | |
| G06F 11/3668 | (2025.01) | |
| G06F 40/242 | (2020.01) | |
| G06F 40/279 | (2020.01) | |
| G06F 40/40 | (2020.01) | |

(52) U.S. Cl.
CPC ........ *G06F 11/3692* (2013.01); *G06F 40/242* (2020.01); *G06F 40/279* (2020.01); *G06F 40/40* (2020.01)

(58) Field of Classification Search
CPC .... G06F 11/3692; G06F 40/279; G06F 40/40; G06F 40/242
See application file for complete search history.

(56) References Cited

U.S. PATENT DOCUMENTS

| | | | | |
|---|---|---|---|---|
| 8,977,948 | B1* | 3/2015 | Balfe | G06F 16/337 |
| | | | | 705/14.1 |
| 2004/0098709 | A1* | 5/2004 | Kyo | G06F 8/447 |
| | | | | 712/22 |
| 2006/0004560 | A1* | 1/2006 | Whitelock | G06F 40/45 |
| | | | | 704/2 |
| 2012/0259616 | A1* | 10/2012 | Peng | G06F 40/253 |
| | | | | 704/E11.001 |
| 2015/0142808 | A1* | 5/2015 | Ren | G06F 18/23213 |
| | | | | 707/737 |
| 2018/0307677 | A1* | 10/2018 | Jiang | G06F 40/30 |
| 2018/0329980 | A1* | 11/2018 | Ebrahim | G06F 16/25 |
| 2019/0079741 | A1* | 3/2019 | Makkar | G06F 8/77 |
| 2019/0114354 | A1* | 4/2019 | Orun | G06F 16/24578 |

(Continued)

*Primary Examiner* — Bradley A Teets
*Assistant Examiner* — Lenin Paulino

(57) ABSTRACT

Aspects of the present disclosure provide systems, methods, and computer-readable storage media that support automated source code review using sentiment analysis with magnitude of entities. Known compliant and non-compliant source code may be used to generate dictionaries for evaluating lines of code using AI and ML techniques, such as by clustering data entities (lines of software code) and performing sentiment analysis on the data entities (lines of software code) which accounts for a magnitude of the data entities in the software code. The dictionaries enable automated review and correction of non-compliant code, such as vulnerable or insecure code, during the coding process. For example, sentiment analysis may be performed using the dictionaries on in-development code to determine a polarity and magnitude score for each line of code. The scores for each line can be compared to one or more conditions to determine a remediation action for individual lines of code.

20 Claims, 6 Drawing Sheets

(56) References Cited

U.S. PATENT DOCUMENTS

| | | | | |
|---|---|---|---|---|
| 2019/0318366 | A1* | 10/2019 | Carranza | G06N 3/08 |
| 2020/0150951 | A1* | 5/2020 | Kimball | G06F 8/72 |
| 2020/0320100 | A1* | 10/2020 | Piecko | G06F 16/26 |
| 2020/0387937 | A1* | 12/2020 | Sheth | G06Q 30/0276 |
| 2021/0055933 | A1* | 2/2021 | Bulut | G06N 20/10 |
| 2021/0329033 | A1* | 10/2021 | Jeffery | G06N 3/045 |
| 2022/0277075 | A1* | 9/2022 | Cummings | H04L 63/1441 |

* cited by examiner

Compliant : (+ Padding of scores)

Cipher c31 = Cipher.getInstance("AES/GCM/NoPadding");

Cipher c = Cipher.getInstance("AES/GCM/NoPadding");

MessageDigest md = MessageDigest.getInstance("SHA-256");

SecureRandom random = new SecureRandom ();

Non-Compliant : (- Padding of scores)

String encoding = Base64Encoder.encode ("login:passwd");

MessageDigest md = MessageDigest.getInstance("SHA1");

Random random = new Random();

FIG. 3

| PLC | CLC | ULC |
|---|---|---|
| Line number n-1 | Line number n | Line number n+1 |
| Line number n | Line number n+1 | Line number n+2 |
| Line number n+1 | Line number n+2 | Line number n+3 |
| ... | ... | ... |
| Line number n+a | Line number n+(a+1) | Line number n+(a+2) |

FIG. 4A

| S. No | PLC (n-1) | CLC (n) | ULC (n+1) |
|---|---|---|---|
| 0 | new Cookie (SECRET, secret); | c. setSecure(true) | Xxx |
| 1 | Yyy | c.setSecure(true) | Xxx |
| 2 | new Cookie (SECRET, secret); | c. setSecure(true) | Xxx |
| 3 | new Cookie (SECRET, secret); | c. setSecure(true) | Xxx |
| 4 | Yyyy | c. setSecure(true) | ... |
| 5 | ... | | |

FIG. 4B

Entity Score = $\dfrac{\text{No. of occurrence of every data element in a cluster}}{\text{Total number of elements in that cluster}}$ + Intensity of LOC + Contextual Score of every LOC (frequency of data element = $f$; $f * 100 = f\%$)

Contextual Score of every LOC:

PLC Count (0.25 x $\dfrac{\text{Matching entries/ Duplicate entries of a data element}}{\text{Total number of that data element}}$)

ULC Count (0.25 x $\dfrac{\text{Matching entries/ Duplicate entries of a data element}}{\text{Total number of that data element}}$)

Intensity of LOC:
If the $f$ % lies in the range of,
0 – 20% : Value of intensity for the data elements = 0.1
20 – 40% : Value of intensity for the data elements = 0.2
40 – 60% : Value of intensity for the data elements = 0.3
60 – 80% : Value of intensity for the data elements = 0.4
80 – 100% : Value of intensity for the data elements = 0.5

**LOC : Line Of Code

FIG. 5

SENTIMENT ANALYSIS USING MAGNITUDE OF ENTITIES

TECHNICAL FIELD

The present disclosure relates generally to automated source code vulnerability review. In particular implementations, the aspects described herein provide for automated source code vulnerability review using sentiment analysis with magnitude of entities.

BACKGROUND

When a program is coded by a developer it can have vulnerabilities or flaws, even if the developer follows best practices. Additionally, even if a developer codes a program that is not found to have any current or known vulnerabilities or flaws, the code can be exposed or subject to later developed attacks which can make it vulnerable. Code which has certain flaws or vulnerabilities can be said to be non-compliant code (e.g., failed to be compliant with a security standard or best practices, any data privacy requirement or standard, and the like).

As a single program often includes hundreds or thousands of lines of code, code review for compliance or vulnerability verification is an exhaustive process. Historically, security of code for a program was evaluated at the end or towards the end of the development process and bolted on at the end of the development process. In an effort to design more secure software, code security has been incorporated earlier in the development process to develop more inherently secured software and ensure a more agile software development processes.

Additionally, automated code scanning programs have been developed over the years to attempt to automate some of these processes and help with the incorporation of security evaluation earlier in the software development process. There are many different types of automated code scanning, each with their own strengths and weaknesses. These include, static code analysis, dynamic code analysis, interactive analysis, and source composition analysis.

Different security testing methodologies have advantages (or weaknesses) when attempting to identify different classes of vulnerabilities. For this reason, applying several application security testing methodologies and tools throughout the software development process is recommended to reduce the number and impact of vulnerabilities that exist in production code.

SUMMARY

Aspects of the present disclosure provide systems, methods, apparatus, and computer-readable storage media that support performing automated code scanning with sentiment analysis using magnitude of entities. Performing automated code scanning with sentiment analysis using magnitude of entities, including with AI and/or ML techniques, provides improved automated code scanning for vulnerabilities. Additionally, automated code scanning with sentiment analysis using magnitude of entities enables assisted or automatic vulnerability remediation. Performing automated code vulnerability remediation with sentiment analysis using magnitude of entities, including implementations utilizing AI and/or ML techniques, provides improved assisted or automatic remediation of identified vulnerabilities.

Sentiment analysis is a text analysis method that detects polarity (e.g., a positive or negative opinion) within the text, whether a whole document, paragraph, sentence, or clause. Sentiment analysis aims to measure the sentiments, evaluations, attitudes, and emotions of a speaker/writer based on the computational treatment of subjectivity in a text. Though it may seem easy in theory, sentiment analysis is a difficult to implement. A text may contain multiple sentiments all at once. For instance, a sentence can have multipole polarities.

VADER (Valence Aware Dictionary for Sentiment Reasoning) is a model used for text sentiment analysis that is sensitive to both polarity (positive/negative) and intensity (strength) of emotion. It can be applied directly to unlabeled text data. VADER sentimental analysis relies on a dictionary that maps lexical features to emotion intensities known as sentiment scores. The sentiment score of a text can be obtained by summing up the intensity of each word in the text. For example, VADER may properly determine that words like 'love' and 'happy' convey a positive sentiment, and even understand when such words can be used as part of a negative statement (e.g., not happy). VADER can also interpret and assign emphasis to other aspects, such as capitalization and punctuation.

VADER aggregates all the sentences in a document or paragraph, to arrive at an overall score indicating an opinion of the emotion of the document or paragraph. However, VADER provides a coarse analysis; it is not a fine-grained analysis that would determine the degree of positivity/negativity. For example, a VADER score would not determine a quantifiable amount of a rating (e.g., 3 stars), only whether the overall analysis was generally positive or negative. Thus, a VADER score only indicates a positive or negative sentiment of the overall document or paragraph. Additionally, the VADER process is not able to properly review or score code because its dictionary/lexicon maps emotions to words.

In the aspects described herein, the present disclosure provides systems, methods, apparatus, and computer-readable storage media that support identifying code statements and determining whether a line of code is vulnerable to an attack or not using sentiment analysis, in real time.

Initially, a set of program instructions, that contains non-compliant code data (e.g., vulnerable or infected data related to any single vulnerability) is taken as an input data set and labeled a non-compliant code set for any selected or for any specific vulnerability. The selected vulnerability may be anything like a sensitive data exposure vulnerability, as an illustrative, non-limiting example. Through a clustering algorithm which allows duplicate entries, such as K-means clustering, different clusters are formed. Each cluster's grouping of entries, lines of code, contains similar keywords or commands, and some of those lines of code (or commands thereof) are responsible for, or enable, a vulnerability to get originated. Allowing the clustering algorithm to not ignore or throw out duplicate lines or commands enables the sentiment analysis to account for (e.g., assign more weight to) repetitive positive or negative statements.

After these clusters are formed, the process may extract the respective code snippets (either a keyword or a line of code) which are captured cluster wise and may calculate a score for every individual entry/entity in the cluster according to its frequency of occurrence in the cluster and its related features. This score may be referred to as an entity score (or data entity score). As these scores are either calculated from a compliant data set or non-compliant data set when training the original model/generating the code dictionary (referred to as data entity/entry dictionary), the process can assign it a sign or prefix of positive or negative. In this example, because the score is calculated with a non-compliant input data set, a negative sign can be added (padded) before the entity scores which means or denotes that these negative entities are associated with the non-compliant input data set. The negative scores of the negative entities may correspond to one factor among a plurality of responsible factors in causing a particular vulnerability to occur. The particular vulnerability may correspond to one or more non-complaint aspects of the non-compliant input data set.

The above steps can be repeated many times. For example, the model can be trained, or the dictionary can be modified, for compliant sets and non-compliant sets with the same vulnerability, or for multiple different vulnerabilities with their own corresponding complaint and non-compliant data sets. When calculating scores for compliant code, the score may be left alone (e.g., not add a negative sign) or the process can actively add or change the sign to positive for scores based on compliant data sets. These scores may be used to determine a magnitude for any entity/entry in the model or dictionary. The scores can be updated/refined based on additional iterations.

Once, generated or trained, the model/dictionary can be used on code which is not labeled, to determine the presence of a vulnerability in real time during development. For example, the model/dictionary can be used to generate a score for individual lines of code via a sentiment analysis process, as described below. Scores can also be generated for code snippets, code blocks/modules, and the overall application as well. The scores, i.e., the magnitude and sign thereof, may be used to determine an emotion of the line of code, and therefore whether an individual line of code is compliant or not.

As an illustrative example, sentiment analysis can be performed on the individual lines of code using the model/dictionary. As another illustrative example, the lines of code of an entire program or portion thereof can be clustered and then sentiment analysis can be performed on the individual lines of the cluster. As explained briefly above, the VADER algorithm generates a polarity score for a word/lexicon by combining power (i.e. emotion and intensity) of a word with others, following certain procedures. Unlike the VADER algorithm, a scoring algorithm according to the present disclosure may calculate a polarity score for code elements (e.g., code blocks or program statements/instructions) using the features of frequency, intensity, and context of a code block with its adjacent ones, and accordingly the algorithm is able to address and determine the sentiments of an individual line of code rather than normal text words.

When processing new code, the process will assign a polarity score to every line or block by going through the entire entity dictionary, which includes both compliant and non-compliant code set's scores and determines the entity score by summing up and negating the entity values in the assessing block. If the final score for a line or block is negative padded, then the developer will be aware that the developed code is vulnerability prone, and using the list of negative scored entities, we can find the type of vulnerability involved there. In future, using one or more conditional algorithms, such as a rules-based decision tree or similar, remediation procedure can be implemented to determine and eradicate vulnerabilities, if negative score gets dominated. For example, a developer when alerted that the code (or a line thereof) would be prone to a vulnerability or an attack based upon the scores, then the conditional algorithm can suggest an equivalent alternate suggestion which would help the developer to replace or rectify the infected code with a proper remediated code. Accordingly, a system may be configured to provide automated source code vulnerability remediation, using sentiment analysis with magnitude of entities to enable intelligent and real time determination and correction of vulnerabilities. One or more conditions, such as a rules-based decision tree analysis, can be implemented to determine one or more code remediation actions if a negative score is generated. For example, a developer may be alerted that the code (or a line thereof) would be prone to a vulnerability or an attack, and optionally, the notification or alert may indicate a modification or corrective action for the code to make it compliant. Accordingly, a system may be configured to provide automated source code review for vulnerabilities using sentiment analysis with magnitude of entities to enable intelligent and real time determination and correction of vulnerabilities.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 3 illustrates examples of compliant and non-compliant code statements according to one or more aspects;

FIGS. 4A-B each illustrate a table of data entries (lines of code) according to one or more aspects; and FIG. 5 illustrates an example of sentiment analysis (entity score generation) according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support automated action recommendation for structured or unstructured processes, such as automated software code review to detect vulnerabilities. Aspects described herein leverage magnitude or intensity based sentiment analysis to analyze software code for compliancy, such as for security testing or vulnerability identification. Aspects described herein may also leverage artificial intelligence (AI) and machine learning (ML) algorithms and/or models to assign features corresponding to code into clusters based on underlying feature relationships using unsupervised learning, to perform sentiment analysis on code, identify non-compliant and compliant instructions of code. Additionally, the aspects described herein may also leverage AI and ML algorithms and/or models to generate remediation actions based on the identified non-compliant code.

In some examples, a system that provides recommendation services receives code data that corresponds to lines of code of a software application, such as a compliant code, a non-compliant code, an unassessed code, etc., as non-limiting examples, and the system assigns the lines of code to one of multiple clusters based on similarity of extracted features. Because the ML algorithms/models are trained using historical code data, members of each cluster correspond to various lines of code that are similar to one another in one or more ways. The lines of code that correspond to members of the assigned cluster are used to generate candidate lines of code for identifying and/or resolving vulnerabilities using concepts of data mining, lattice data, and other techniques. In some examples, the generation of candidate lines of code includes reducing the total number of candidate lines of code based on scores determined from application of associative rules and, after the reduction, generating multiple incremental candidate code snippets (portions of lines of code). The candidate code snippets can be pruned and filtered based on adjacent lines of code, as well as based on corresponding associated rule scores, to generate an incremental ordering of candidate code snippets that satisfy certain thresholds. The highest-ranking candidate code snippets are provided as recommended lines of code that represent code to be either used or avoided, such as by a user of a client device or automatically by the client device or other systems, in order to complete performance of the current instance of the code.

Figure 1:
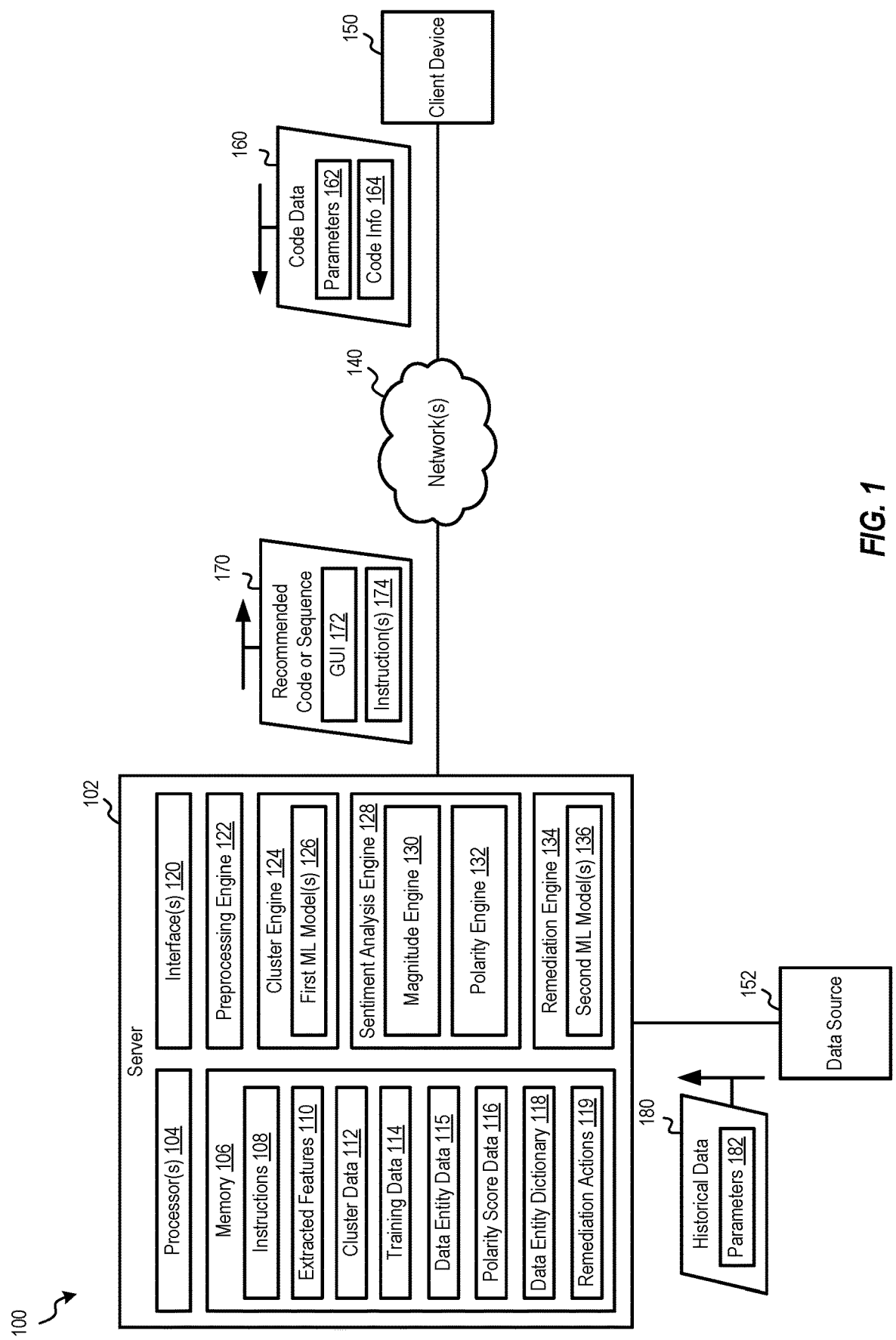
FIG. 1 is a block diagram of an example of a system that supports automated source code review using sentiment analysis with magnitude of entities according to one or more aspects.

Referring to FIG. 1, an example of a system for automated action recommendation for software code review according to one or more aspects is shown as a system 100. As shown in FIG. 1, the system 100 includes a server 102, a client device 150, a data source 152, and one or more networks 140. In some implementations, the system 100 may include additional components that are not shown in FIG. 1, such as one or more additional client devices, additional data sources, and/or a database configured to store extracted features, cluster data, code data, model parameters, or a combination thereof, as non-limiting examples.

The server 102 may be configured to recommend actions (e.g., remediation actions) to complete software code review based on sentiment analysis using a magnitude of data entities (e.g., lines of code of the software code). Although described as a server 102, in some other implementations, the system 100 may instead include a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The server 102 includes one or more processors 104, a memory 106, one or more communication interfaces 120, a preprocessing engine 122, a cluster engine 124, a sentiment analysis engine 128, and a remediation engine 134. In some other implementations, one or more of the components are optional, one or more additional components are included in the server 102, or both.

It is noted that functionalities described with reference to the server 102 are provided for purposes of illustration, rather than by way of limitation, and that the exemplary functionalities described herein may be provided via other types of computing resource deployments. For example, in some implementations, computing resources and functionality described in connection with the server 102 may be provided in a distributed system using multiple servers or other computing devices, or in a cloud-based system using computing resources and functionality provided by a cloud-based environment that is accessible over a network, such as the one of the one or more networks 140. To illustrate, one or more operations described herein with reference to the server 102 may be performed by one or more servers or a cloud-based system that communicates with one or more client or user devices. Alternatively, the one or more operations described herein with reference to the server 102 may be performed by the client device 150. For example, in some implementations the model data, or a portion thereof, may be provided to the client device 150, and the client device 150 may analyze the software code and determine remediation actions to fix non-compliant code.

The one or more processors 104 includes one or more microcontrollers, application specific integrated circuits (ASICs), field programmable gate arrays (FPGAs), central processing units (CPUs) having one or more processing cores, or other circuitry and logic configured to facilitate the operations of the server 102 in accordance with aspects of the present disclosure. The memory 106 includes random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the server 102 are stored in the memory 106 as instructions 108 that, when executed by the one or more processors 104, cause the one or more processors 104 to perform the operations described herein with respect to the server 102, as described in more detail below. Additionally, the memory 106 is configured to store data and information, such as extracted features 110, cluster data 112, training data 114, data entity data 115 (e.g., data entity score data), polarity score data 116, data entity dictionary data 118, and one or more recommendations (referred to herein as "remediation actions 119"). In some implementations, the memory 106 is configured to further store similarity coefficient data (or dissimilarity coefficient data), principal feature data, natural language processing (NLP) data, programing language conversion data, or a combination thereof. Illustrative aspects of the extracted features 110, the cluster data 112, the training data 114, the data entity data 115, the polarity score data 116, the data entity dictionary data 118, the similarity coefficient data, the principal feature data, the NLP data, the programming language conversion data, and the remediation actions 119 are described in more detail below.

The one or more communication interfaces 120 are configured to communicatively couple the server 102 to the one or more networks 140 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the server 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the server 102. In some implementations, the server 102 is coupled to a display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the server 102. In some other implementations, the server 102 is communicatively coupled to one or more client devices that include or are coupled to respective display devices.

The preprocessing engine 122 is configured to preprocess (e.g., perform one or more preprocessing operations on) received data, such as current code data or historical code data, to convert the received data to a form that can be used by the engines and ML models described herein. Particular examples of the preprocessing operations include removing empty data sets or values, validating parameters of code included in received data, converting at least a portion of the received data to a common format (e.g., from one programming language to another programming language or to a natural language format), other preprocessing operations, or a combination thereof. In some implementations, the preprocessing engine 122 is further configured to discard features that are not included in primary features identified based on an affinity analysis performed on historical code data by the preprocessing engine 122 and/or the processor 104, as further described herein.

The cluster engine 124 may be configured to determine and/or assign input feature sets that represent software code elements to one of multiple clusters of feature sets based on underlying relationships between the input features sets and the features sets that are members of the multiple clusters. The clusters may be initially determined by clustering feature sets extracted from historical code data related to past performance of the structured or unstructured process of automated source code review (e.g., analysis of compliant input set data and/or non-compliant input set data). As a particular, non-limiting example, the cluster engine 124 clusters thirty feature sets extracted from historical code data into ten clusters based on the similarities and differences of the values of the extracted feature sets, and after the initial clustering, the cluster engine 124 may assign an input feature set to one of the ten clusters that has members that are most similar to the input feature set based on underlying relationships learned from the initial clustering operations. The cluster engine 124 may be configured to perform clustering according to one or more clustering algorithms, such as K-means, K-modes, means-shift clustering, density-based spatial clustering of applications with noise (DBSCAN), expectation-maximization (EM) clustering using Gaussian mixture models (GMM), hierarchical clustering, agglomerative clustering, spectral clustering, balanced iterative reducing and clustering (BIRCH), ordering points to identify the clustering structure (OPTICS), or the like.

In some implementations, the cluster engine 124 is an unsupervised model, that is the cluster engine 124 may not use labeled data as inputs. In other implementations, the cluster engine 124 is a supervised model which receives labeled data as inputs, such as compliant code statements and non-compliant code statements.

In some implementations, the cluster engine 124 may determine or receive a number of cluster to split the data into. For example, the cluster engine 124 may determine the number of cluster based on user response, a received or pre-set number, trial and error, etc. In a particular implementation, the cluster engine 124 uses the Elbow method for determine the number of clusters.

In some implementations, the cluster engine 124 includes and/or integrates, or has access to, one or more ML models (referred to herein as "first ML models 126") that are configured to perform the clustering operations. The first ML models 126 may include or correspond to one or more neural networks (NNs), such as restricted Boltzmann machines (RBMs), variational autoencoders (VAEs), generative adversarial networks (GANs), singular value decomposition (SVD) models, principal component analysis (PCA) models, or the like. In other implementations, the first ML models 126 may include or correspond to other types of ML models, such as agglomerative hierarchal clustering (AHC) models, anomaly detection models, k-nearest neighbors (KNN) models, K-Means clustering models, Density-Based Spatial Clustering of Applications with Noise (DBSCAN) models, Deep Convolutional GANs (DCGANs), Gaussian mixture models (GMMs), Apriori algorithm for association rules, or the like. The first ML models 126 may be trained using unsupervised learning to cluster input feature sets into one of multiple clusters based on underlying relationships between feature sets of members of the multiple clusters. The input feature sets include extracted features from historical code data representing compliant code and non-compliant code determined during past (e.g., previous or prior) performances of a manual or automated (e.g., structured or unstructured process) or from labeled data sets.

The compliant code, the non-compliant code, or both may be determined manually by prior manual code testing, vulnerability lists or databases, or a combination thereof. For example, a code that has been proven to be secure or without bugs can be used as a labeled input of compliant code. Compliant code can be used to assign positive polarity scores during sentiment analysis, as described further herein. Additionally, or alternatively, non-compliant code can be used to assign negative polarity scores during sentiment analysis, as described further herein.

Additionally, or alternatively, the compliant code, the non-compliant code, or both may be determined by an automated process, such as ML or AI process (e.g., structured or unstructured process). The automated process may be performed by client devices such as the client device 150, as further described herein. As a particular example, the first ML models 126 may be trained to perform K-means clustering on numerical features corresponding to lines of code.

As another example, the first ML models 126 are trained to perform K-modes clustering on categorical features corresponding to lines of code. In some such implementations, initial seeds for the clustering are selected based on similarity scores (or dissimilarity scores), as further described herein. Although implementations described herein include both training and deployment of the first ML models 126 by the server 102, in some other implementations, the first ML models 126 may be trained by one or more other devices and ML model parameters may be provided to the server 102 to deploy the first ML models 126 at the server 102. Thus, in at least some implementations, device(s) that train the first ML models 126 are not the same as device(s) that host the first ML models 126 to support the action recommendation described herein.

The sentiment analysis engine 128 may include a magnitude engine 130 and a polarity engine 132. The magnitude engine 130 and the polarity engine 132 may be configured to work together, such as in series or parallel. Alternatively, in some implementations, the magnitude engine 130 and the polarity engine 132 are combined into a single engine. The magnitude engine 130 may be configured to determine an entity score of a data entity, such as described further with reference to FIG. 5. The polarity engine 132 may be configured to determine a polarity (e.g., sign) or emotion for the entity scores, such as described further with reference to FIG. 5.

The sentiment analysis engine 128 (e.g., the magnitude engine 130 thereof) is configured to analyze lines of code, code features, or code snippets of software code that corresponds to selected clusters to generate a score (entity score) for the individual lines of code of the cluster based on intensity, frequency and context (e.g., surrounding lines of code) for evaluating the compliancy (e.g., security/vulnerability) of a software application (software routine or process). This entity score may correspond to or represent an intensity or magnitude score for impact of the code (individual line of code) on the overall cluster or application.

The sentiment analysis engine 128 (e.g., the polarity engine 132 thereof) is also configured to apply a polarity to the generated entity or magnitude score. For example, the sentiment analysis engine 128 may be configured to apply a positive sign (e.g., multiply by 1, do nothing, or not multiply by −1) or a negative sign (e.g., multiply by −1) based on one or more data entity dictionaries (e.g., code snippet dictionary). A data entity dictionary (e.g., compliant data entity dictionary, non-compliant data entity dictionary, neutral data entity dictionary, etc.) may be determined (e.g., by AI or ML processes) or received for the code entries with their respective scores. For example, a data entity dictionary (data entity dictionary data 118) may be generated by running the above described process of the sentiment analysis engine 128 to generate data entity scores for the individual lines of code, of a tagged or known compliant data set, of the cluster based on intensity, frequency and context. The data entity dictionary (data entity dictionary data 118) may include scores for each vulnerability, and separately for a compliant data set and a non-compliant data set.

In some implementations, the sentiment analysis engine 128 uses a scoring algorithm to train or determine sentiment analysis. The scoring algorithm may use a code-based lexicon (e.g., a lexicon of code blocks (including syntactic study), program statements, program instructions, etc.) to calculate the entity score described above. Accordingly, the scoring algorithm can be used to address and find out the sentiments of an individual line of code (or multiple lines of code, such as a block, module, or entire application) rather than normal text words.

In some implementations, the sentiment analysis engine 128 may be configured to extract one or more candidate lines of code or code sequences (e.g., patterns) that correspond to members of a selected cluster and to generate incremental candidate code portions (e.g., code snippets, such as functions or variables) that that may be used to complete the automated code analysis, such as used to identify a potential vulnerability fix. The process of extracting code and code sequences and generating incremental candidate code or code snippets may also be referred to as incremental latticing, such as extracting lattices and generating incremental sub-lattices. The sentiment analysis engine 128 may be configured to reduce the number of candidate code snippets based on a current score for the software application, a current score for the cluster, apply one or more associative rules to score the candidate code snippets according to one or more association scores, and filter (e.g., discard) candidate code snippets having scores that fail to satisfy one or more thresholds. This process is also referred to as interlacing searching, pruning, pattern mining, and incremental latticing, to generate a reduced set of candidate code snippets (e.g., sub-lattices) representing portions of code that can be evaluated to complete the automated code analysis. In some implementations, the sentiment analysis engine 128 may be further configured to rank the remaining candidate code snippets, such as based on the association scores, and to output a particular number of highest ranked candidate code snippets as recommended code and/or remediation actions.

The remediation engine 134 is configured to generate a remediation action based on the polarity score (also referred to as a polarized score) generated by the sentiment analysis engine 128. For example, the remediation action may be performed as a multi-layered process, and each layer may correspond to a different channel. The remediation engine 134 may be configured to convert the candidate code or code snippets to channelized code or code snippets that each correspond to a respective channel, and these channelized code or code snippets may be output as recommended code snippets or code sequences to be performed by different ML or AI services that are configured to support performance of the automated code analysis, as further described herein. For example, a channel may include or correspond to a code function or command type, and remediation actions may be identified per code function or command type.

In some implementations, the remediation engine 134 includes or integrates, or has access to, one or more ML models (referred to herein as "second ML models 136") that are configured to perform the channelizing operations. The second ML models 136 may include or correspond to one or more NNs, such as MLP networks, RBMs, VAEs, GANs, SVD NNs, or the like. In other implementations, the second ML models 136 include or correspond to other types of ML models, such as AHCs, anomaly detection models, KNN models, k-means models, DBSCAN models, DCGANs, GMMs, Apriori algorithms, or the like. The second ML models 136 are trained using unsupervised learning to perform classification on input features that represent code or a code sequence to classify the source code (or portions thereof) as belonging to one of multiple data entities or code statements (e.g., channels). The input feature sets include extracted features from historical code data representing code performed during past (e.g., previous or prior) performances of automated source code review, and the feature sets are labeled based on the corresponding channel to which the code is assigned. Although implementations described herein include both training and deployment of the second ML models 136 by the server 102, in some other implementations, the second ML models 136 may be trained by one or more other devices and ML model parameters may be provided to the server 102 to deploy the second ML models 136 at the server 102. Thus, in at least some implementations, device(s) that train the second ML models 136 are not the same as device(s) that host the second ML models 136 to support the action recommendation described herein.

The client device 150 is configured to communicate with the server 102 via the one or more networks 140 to provide code data related to a software process or application for use by the server 102 to recommend one or more actions, such as one or more recommended remediation actions, for completing performance of automated source code analysis of a vulnerability. The client device 150 may include or correspond to a computing device, such as a desktop computing device, a server, a laptop computing device, a personal computing device, a tablet computing device, a mobile device (e.g., a smart phone, a tablet, a PDA, a wearable device, and the like), a VR device, an AR device, an XR device, a vehicle (or component(s) thereof), an entertainment system, another computing device, or a combination thereof, as non-limiting examples. The client device 150 may include a processor, one or more communication interfaces, and a memory that stores instructions that, when executed by the processor, cause the processor to perform the operations described herein, similar to the server 102.

The data source 152 is configured to be accessible to the server 102 (and optionally the client device 150) via the one or more networks 140 to enable retrieval of data, such as historical code data, related to past performances of source code analysis. In some implementations, the historical code data includes or corresponds to source code labeled or determined to be compliant code, non-compliant code, or neutral. Data sets of compliant, non-compliant source code, and/or neutral source code may enable to the server 102 to build a data entity dictionary for automated code analysis. The data source 152 may include or correspond to a database, cloud storage, external storage, or the like, or to a computing device, such as a desktop computing device, a server, a laptop computing device, a personal computing device, another computing device, or a combination thereof, as non-limiting examples. In implementations in which the data source 152 is a computing device, the data source 152 may include a processor, one or more communication interfaces, and a memory that stores instructions that, when executed by the processor, cause the processor to perform the operations described herein, similar to the server 102.

During operation of the system 100, the server 102 deploys the first ML models 126 to provide automated intelligent action recommendation services to client devices. For example, the client device 150 may be configured to support automated source code review, and based on code data 160 that include or corresponds to a software process, a software application, or in-development lines of code. In such implementations, the client device 150 or the server 102 may recommend one or more remediation actions to be performed to cure potential or identified non-compliancy (vulnerabilities/flaws) in the code. Performance of at least some of the remediation actions results in one or more defined outcomes (e.g., compliant code). For example, if the code includes encryption lines of code, there may be one or more remediation actions to modify certain lower encryption lines of code to be higher encryption lines of code. Additionally, or alternatively, a line of code may have its command changed. For example, an "encryption" line of code or an unencrypted get command/line of code may be changed to an encrypted get command/line of code.

The remediation actions can be performed automatically by the client device 150 or can require user input from a user of the client device 150, or both. Examples of lines of code are described further herein with reference to FIG. 2. Although particular examples provided herein are described in the context of Java code, the aspects described herein are applicable to any type of coding language. To support the automated action recommendation services in some implementations, the server 102 deploys and maintains one or more types of ML models, such as the first ML models 126 and, optionally, the second ML models 136. In some implementations, the server 102 trains the various ML models to perform the operations described herein, such as for different programing languages. In some other implementations, some or all of the ML models are trained at other devices or locations, and the parameters of the trained ML models are provided (e.g., transmitted, downloaded, or otherwise stored at or accessible to) the server 102 for implementing the ML models.

In implementations in which the server 102 trains the first ML models 126, the server 102 obtains (e.g., retrieves) historical code data 180 from the data source 152. The historical code data 180 may include or correspond to compliant source code and/or non-compliant source code. The compliant source code, non-compliant source code, or both, may be previously determined by the server 102, the client device 150, or another device.

The historical code data 180 may include or correspond to one or more past performances of the automated source code review performed by the client device 150. For example, the historical code data 180 can include parameters 182 of events (e.g., tasks, actions, etc.) that have been performed during one or more past performances (e.g., instances) of the automated source code review. As an illustrative example, the historical code data 180 indicates that a first instance of the automated source code review included a certain amount of clusters, type of clusters, type of data elements, etc. In this example, the parameters 182 may include indications of compliant code statements, non-compliant code statements, numbers of clusters, type of programing language, type of preprocessing, data entity feature or similarity data, remediation actions, conditions (e.g., conditions for a rules-based decision tree), or a combination thereof.

In such implementations in which the server 102 trains the first ML models 126, the server 102 provides the historical code data 180 to the preprocessing engine 122 to perform preprocessing on the historical code data 180. The preprocessing operations include one or more operations for formatting the historical code data 180, removing unusable entries, filling in missing entries, or otherwise preparing the historical code data 180 to be in a form that is useful to the first ML models 126. As an example, the preprocessing operations may include validating the parameters 182, such as studying the parameters 182 to accept its syntactic values of the source code (e.g., a programming language) by comparing it against the secure code database. In an aspect, the secure code database may include custom or proprietary databases and/or databases generated by third parties, such as a database generated by the Open Web Application Security Project (OWASP). Studying the parameters 182 may include comparing syntax scores of parameters 182 to a database of acceptable syntax scores for a particular programing language. As another example, the preprocessing operations may include parsing at least a portion of the historical code data 180 to a common format, such as a format that is used by input to the first ML models 126. To illustrate, Python code can help in parsing a Java code or JavaScript code using specified packages, as illustrative, non-limiting examples. Alternatively, the historical code data 180 (or a portion thereof) can be converted to a common format.

After the preprocessing (or included as a next step of the preprocessing), the server 102 may extract features from the historical code data 180 to generate training data 114 for use in training the first ML models 126. The extracted features indicate the code represented by the historical code data 180, the parameters 182, other information, or a combination thereof. In some implementations, the server 102 performs an affinity analysis on the extracted features to identify a subset of the features for which variance satisfies a threshold as the principal features. The features having less variance (e.g., that do not satisfy a threshold) are considered to have less effect on the selection of code or remediation actions during performance of the automated code review (e.g., such as on clustering or with regards to compliancy/vulnerability), and therefore may be discarded to reduce the size of the features to be used as the training data 114. For example, only the extracted features types that match the principal features are retained (e.g., the other extracted features are discarded) and used to generate the training data 114. Examples of feature variance and feature reduction are further described herein with reference to FIG. 2.

After performing the affinity analysis and reducing the extracted features based on the principal features, the remaining features are used to generate the training data 114, and the server 102 provides the training data 114 to the cluster engine 124 to train the first ML models 126. In some implementations, the training data 114 is partitioned into training data, test data, and validation data for the purposes of training such that the first ML models 126 are tested after training to ensure one or more parameters, such as accuracy, speed, or the like, are satisfied by the trained first ML models 126, or else the first ML models 126 may be further trained before deployment.

The first ML models 126 may be trained to perform unsupervised learning-based clustering to assign the extracted features (and the corresponding code or code snippets from which the features are extracted from) to multiple clusters. Because the feature sets may not be labeled with clusters, the first ML models 126 may be trained to perform clustering using unsupervised learning. In some implementations, the type of clustering performed by the first ML models 126 is K-means clustering. In some other implementations, the first ML models 126 are trained to perform other types of clustering, such as K-modes clustering as a non-limiting example. The clustering is performed based on one or more parameters that are preconfigured at the server 102 or selected by a user, such as an initial seeding type.

In some implementations, randomized initial seeding may be used, such as in implementations in which K-means clustering is used. In some such implementations, the number of clusters are determined using Elbow technique. Training the first ML models 126 in this manner results in the assignment of the feature sets represented by the training data 114 to corresponding clusters of a group of clusters (e.g., multiple clusters) based on underlying relationships between the features that are learned by the first ML models 126. The resultant clusters, including the number of clusters and the members of each cluster, are stored at the memory 106 as the cluster data 112 for use by the first ML models 126 during post-training operations.

In some other implementations, other types of initial seeding methods are used. For example, K-modes clustering may be used and the initial seeding may be determined based on similarity coefficients (and/or dissimilarity coefficients) between candidate members of the multiple clusters. In such implementations, the server 102 determines the dissimilarity coefficients that represent a dissimilarity or dissimilarities between one or more of the extracted feature sets that make up the training data 114. The initial centroids are determined based on the 'Huang' initial seeding method using the dissimilarity coefficients. Determining the initial seeding artefacts in this manner creates clusters based on frequency of vertical patterns and horizontal sequences in the historical code data 180. This 'Huang' initial seeding method works particularly well in environments in which the historical code data 180 contains a mix of both ordered discrete (e.g., ordinal) data and unorder discrete (e.g., nominal) data.

After training the first ML models 126 (if training occurs at the server 102) or after obtaining ML model parameters from another source, the server 102 implements the trained first ML models 126 using the ML model parameters. Implementing and maintaining the first ML models 126 enables the server 102 to support automated action recommendation services, such as to the client device 150. When the client device 150 utilizes the automated action recommendation services, the client device 150 sends the code data 160 to the server 102. The code data 160 corresponds to partial source code (e.g., a partially complete or fully incomplete software routine, application, or program) in development by the client device 150. For example, the code data 160 indicates or includes parameters 162 of source code that have been determined during automated source code review or source code development. Parameters 162 of the code data 160 may include or correspond to parameters 182 of the historical code data 180. As an illustrative example, the code data 160 may indicate indications of compliant code statements, non-compliant code statements, numbers of clusters, type of programing language, type of preprocessing, data entity feature or similarity data, remediation actions, conditions (e.g., conditions for a rules based decision tree), or a combination thereof.

The server 102 provides the code data 160 to the preprocessing engine 122 to perform one or more preprocessing operations on the code data 160 to preprocess the code data 160 prior to extracting the extracted features 110. The preprocessing operations include one or more operations for formatting the code data 160, removing unusable entries, filling in missing entries, or otherwise preparing the code data 160 to be in a form that is useful to the first ML models 126. As an example, the preprocessing operations may include validating the parameters 162, such as comparing the parameters 162 to acceptable values or value ranges associated with the automated code review to ensure that no unexpected or incorrect remediation actions are indicated by the code data 160. As another example, the preprocessing operations may include converting at least a portion of the code data 160 to a common format, such as a format that is used by input to the first ML models 126.

The preprocessing performed by the preprocessing engine 122 may also include feature extraction. For example, the preprocessing engine 122 (or the processor 104), after performing the above-described preprocessing, extracts features from the code data 160 to generate the extracted features 110. The extracted features 110 indicate portions or snippets of the code represented by the code data 160, the parameters 162, other information, or a combination thereof. In some implementations, the preprocessing engine 122 (or the processor 104) performs feature reduction on the extracted features 110 to reduce the number of features, thereby reducing a storage footprint of the extracted features 110 and processing resources utilized to implement and maintain the first ML models 126. For example, feature types that do not correspond to the principal features (e.g., a subset of features identified based on performance of an affinity analysis on features extracted from the historical code data 180) may be discarded, such that the remaining features of the extracted features 110 only include feature types that match the principal features.

In some implementations, the preprocessing engine 122 includes or corresponds to a NLP engine which may be configured to perform one or more NLP operations on software code data to extract lines of code, code features, and/or code snippets. The software code data represents multiple lines of software code (each with one or more commands), and may be retrieved from a software database or received from a user. In some implementations, prior to performing the NLP operations, the NLP engine may perform one or more preprocessing operations on the social media data prior to performing the NLP operations, such as contraction expansion, case conversion, punctuation removal, removal of words that include unrecognized characters, stopword removal, text rephrasing, stemming and lemmatization, white space removal, or the like, or any combination thereof.

Performing NLP on the (optionally preprocessed) software code data may generate processed text data, vectorized representations of text, or the like, from which code clustering and sentiment analysis can be performed. The NLP operations may recognize characters, words, sentences, punctuation marks, or a combination thereof, in the software code data and organize or structure the recognized elements for processing. For example, the NLP performed by the NLP engine may include code line recognition, code feature recognition, comment recognition, tokenization, lemmatization, stemming, phrasing, sentence tokenization, part-of-speech tagging, dependency parsing, stop-character parsing, named entity recognition, other processing operations, or a combination thereof. After performing the NLP operations, the NLP engine may identify and extract the comments from processed software code data. As used herein, a comment or software comment includes a phrase or sentence-like structure preceded and/or followed by one or more delimiters, often two repeating delimiters. Non-limiting examples of delimiters include special characters like a hash character '#', an exclamation mark T, etc. Although described herein as using NLP to extract comments from lines of software code, in other implementations, extraction of comments may be performed by one or more rules, such as remove all text between certain delimiters.

The cluster engine 124 provides at least some of the extracted features 110 (e.g., the remaining features after the feature reduction) as input data to the first ML models 126 to cause the first ML models 126 to assign the extracted features 110 (e.g., an input feature set) to one of the multiple clusters indicated by the cluster data 112. For example, if the cluster data 112 indicates that there are ten clusters, the first ML models 126 assigns the input feature set to the cluster to which the input feature set has the most similarity based on the underlying relationships between features learned by the first ML models 126 during the clustering of the training. The assigned cluster may have one or more other members besides the newly assigned input feature set, and each member of the assigned cluster corresponds to a line of code or code snippet indicated by the historical code data 180. As such, the cluster engine 124 identifies the data entities (lines of software code) corresponding to members of the assigned cluster and provide these lines of code or code sequences as input to the sentiment analysis engine 128.

The sentiment analysis engine 128 may receive the data entities (lines of software code) provided by the cluster engine 124, or the cluster engine 124 may provide an indication of the assigned cluster and the sentiment analysis engine 128 may extract the corresponding data entities (lines of software code) from the cluster data 112. The sentiment analysis engine 128 identifies the data entities (lines of software code) as candidate code or code sequences (e.g., the sentiment analysis engine 128 generates the candidate code or code sequences 130 from the cluster data 112 or based on input from the cluster engine 124) to be used to determine recommended code or code sequences using one or more sentiment analysis processes with magnitude of entities. The sentiment analysis engine 128 may discard (e.g., not include in the candidate code or code sequences 130) code or code sequences that have one or more associative rule scores that fail to satisfy one or more thresholds. In some implementations, the one or more scores include a support score, a confidence score, and a lift score, and the one or more thresholds may include a common threshold, such as a 50 percentile score, or different thresholds for different scores. The sentiment analysis includes, after identifying the candidate code or code sequences, generating a data entity dictionary of scores or incremental score updates for the data entity dictionary based on the candidate code or code sequences.

The sentiment analysis engine 128 may then rank the candidate code or code sequences based on the corresponding associative rule scores and output a particular number of highest ranked candidate code or code sequences as at least one recommended code or code sequence (referred to herein as "recommended code or code sequences 170"). For example, the sentiment analysis engine 128 outputs the highest ranked candidate code or code sequence or a particular number of multiple highest ranked candidate code or code sequences as the recommended code or code sequences 170. The particular number may be preprogrammed, based on user input, based on a target parameter (e.g., accuracy of recommendations), or the like.

In some implementations, the magnitude engine 130 of the sentiment analysis engine 128 generates one or more component scores to rank the candidate code. For example the magnitude engine 130 may generate an entity score for a line of code based on a frequency score, an intensity score, and a contextual score, as described further with reference to FIG. 5. The magnitude engine 130 may include one or more engines or analyzers to generate the scores. For example, the magnitude engine 130 may include a frequency analyzer (e.g., an occurrence analyzer) and a contextual analyzer (e.g., a co-occurrence analyzer).

The frequency analyzer may be configured to determine frequency counts for a single line of code clustered by the cluster engine 124. The frequency analyzer may also be configured to determine a frequency score and an intensity score based on the frequency counts. As a particular, non-limiting example in which there are 200 lines of codes of code clustered into 4 clusters by cluster engine 124, frequency analyzer may determine a frequency of each line of code in a cluster or application. To illustrate, frequency analyzer may determine, for the first line of code, a frequency count for the first line of code in a first cluster based upon the occurrence of first line of code to the total lines of codes in a first cluster. The frequency analyzer may also determine, for a second line of code, a frequency count for the second line of code in the first cluster, based upon the occurrence of second line of code to the total lines of codes in the first cluster. In this example, the frequency count for the first line of code indicates the number of individual lines of code (of the cluster or application) that include the first line of code or portions thereof (e.g., commands, variables, etc.) in the first cluster and the frequency count for the second line of code indicates the number of individual lines of code (of the cluster or application) that include the second line of code or portions thereof (e.g., commands, variables, etc.) related in some ways to the first line of code, and thus gets an entry in the first cluster.

In some implementations, the frequency score for a particular line of code (or code snippet) corresponds to the frequency count for the particular line of code (or code snippet). Additionally, the intensity score for a particular line of code (or code snippet) may be generated based on the frequency count for the particular line of code (or code snippet). That is, the frequency may be used as an input into an equation or a lookup table. As an illustrative example, a frequency count of $6/10$ may generate an intensity score of 0.3, according to FIG. 5.

The contextual analyzer may be configured to determine contextual frequency counts for at least two lines of code clustered by the cluster engine 124. The contextual analyzer may also be configured to determine a contextual score based on the contextual frequency counts. Although described herein as determining contextual frequency counts (also referred to as co-occurrence frequency counts) for each of the lines of code, contextual frequency counts are determined for multiple lines of code (e.g., at least two lines of code). A contextual (or co-occurrence) frequency count is the number of co-occurrences of the corresponding lines of code in the software code or code cluster. To illustrate, a first co-occurrence frequency count for a first line of code and a second line of code is the number of instances that include the appearance of both the first line of code and the second line of code together within a particular quantity of lines (e.g., preceding and/or succeeding line) in a cluster or application. A contextual score may be determined based on multiple co-occurrence frequency counts and scores. For example, each line of code may have a preceding co-occurrence score and a future or preceding co-occurrence score for the same combination of lines of code (first and second line of code), or combination of code snippets.

As a particular, non-limiting example in which there are 200 line of codes of code clustered into 4 clusters by cluster engine 124, 78 lines of code are captured in a first cluster. Out of the 78 lines of code in the first cluster, if the first line of code always gets accompanied by second line of code in a number of instances, then the frequency of a first line of code with and without the second line of code is computed to determine the co-occurrence frequency. To illustrate, co-occurrence analyzer may determine, for the first line of code, a first co-occurrence frequency count for the first line of code and the second line of code, a second co-occurrence frequency count for the first line of code and a third line of code, a third co-occurrence frequency count for the first line of code and a fourth line of code, and other co-occurrence counts for the first line of code with any of its adjacent remaining lines of code. In this example, the first co-occurrence frequency count indicates the number of individual lines of code (of the cluster or application) that include both the first line of code and the second line of code within the particular quantity of lines of code, the second co-occurrence frequency count indicates the number of individual lines of code (of the cluster or application) that include both the first line of code and the third line of code. To further illustrate, if the first line of code is included in 50 lines of code (of a cluster or application), 15 of which are next to the second line of code, 10 of which are next to the third line of code, and 2 of which are next to fourth line of code, the first co-occurrence frequency count of the first line of code with the second line of code is 15, the second co-occurrence frequency count of the first line of code with the third line of code is 10, and the third co-occurrence frequency count of the first line of code with the fourth line of code is 2.

The sentiment analysis engine 128, such as the magnitude engine 130 thereof, may determine the entity score for each line of code or code snippet based on all of the corresponding component scores. The polarity engine 132 of the sentiment analysis engine 128 may assign a polarity to the entity scores in some implementations. For example, the polarity engine 132 may assign a positive sign or a negative sign to the entity scores based on the input data being labeled data or otherwise indicating compliant code or non-compliant code respectively.

The server 102, such as the processor 104 thereof, may determine the data entity dictionary, such as the magnitude and polarity scores for the data entries thereof based on the polarity scores. Generating the data entity dictionary (data entity dictionary data 118) may enable performance of sentiment analysis on raw or unlabeled code. Additionally, or alternatively, the server 102, such as the processor 104 thereof, may determine AI or ML models for the data entries thereof based on the polarity scores, and the AI or ML models may be used for sentiment analysis of raw or unlabeled code.

As an illustrative, non-limiting example, raw or unlabeled source code may be received at the client device 150 and processed at the client device 150, or the raw or unlabeled source code may be transmitted to the server 102 and processed at the server 102. The raw or unlabeled data may or may not be clustered. In some implementations, sentiment analysis is performed on the raw, unclustered code (lines or snippets thereof)) to generate polarity scores for the lines or snippets of code using the entries (magnitude and polarity, polarity scores) of the data entity dictionary (data entity dictionary data 118), the AI or ML models, or both. In some other implementations, sentiment analysis is performed on the raw, clustered code (lines or snippets thereof) to generate polarity scores for the lines or snippets of code using the entries (magnitude and polarity, polarity scores) of the data entity dictionary (data entity dictionary data 118), the AI or ML models, or both. The obtained polarity scores of the raw, unlabeled code (e.g., code that is in the development process, such as code which is evaluated on the fly in real time) may be used to determine one or more remediation actions. The polarity scores may also be aggregated per cluster, per application, or per snippet to further identify compliant and non-compliant code sections.

The server 102 may output the recommended code or code sequences 170 to the client device 150, and optionally to other devices, to provide recommendations for actions to perform to complete the automated code analysis. For example, each code snippet or sequence of the recommended code or code sequence 170 includes one or more remediation actions to be performed to complete the automated code analysis. In some implementations, outputting the recommended code or code sequence 170 includes sending the recommended code or code sequence 170 to the client device 150 to be displayed in a graphical user interface (GUI) 172. For example, the server 102 may initiate display of the GUI 172 at the client device 150, and the GUI 172 includes the recommended code or code sequences 170 (e.g., an action to implement a particular line of code or combination of lines of code in place of a pre-existing line of code). To further illustrate, the GUI 172 may include a dashboard that displays a user selected code or code sequence of the recommended code or code sequences 170 (e.g., actions to be performed, statuses to be monitored, etc.), and optionally related information such as associated rule scores, to enable completion of the automated code analysis. Additionally or alternatively, outputting the recommended code or code sequences 170 may include sending instructions 174 to the client device 150 (or to other devices) to cause the client device 150 to automatically perform one or more actions of the recommended code or code sequences 170 (e.g., replace or modify lines of code without user input).

In some implementations, the server 102 is configured to support determination of identification of remediation actions by providing sets (e.g., channelized sets) of recommended remediation actions to be utilized with AI/ML services for each data entity or code statement. In these implementations, the server 102 provides the recommended code or code sequence 170 as input data to the remediation engine 134. The remediation engine 134 provides the recommended remediation action (recommended code or code sequence) 170 as input to the second ML models 136 to generate the remediation actions 119. The actions of the remediation actions 119 may correspond to compliant data entities (software code) as indicated by the polarity (positive sign) and larger magnitude (e.g., closer to 1). Channelizing the recommended code or code sequence 170 may divide the data entities into types of code statements (e.g., software functions) that correspond to the different types of functions. The second ML models 136 may be trained to channelize remediation actions based on an unsupervised learning processes, such as training a classifier based on labeled training data (e.g., historical code or code sequences that are labeled by channel or code type). The remediation actions 119 output by the second ML models 136 are provided to the processor 104 to automatically respond to or manage performance of the automated source code analysis via layer-specific ML and AI models. The server 102 may initiate performance of one or more operations based on the remediation actions 119 instead of outputting the recommended code or code sequences 170.

In some implementations, the server 102, utilizes one or more conditions to identify or modify remediation actions, such as a rules based decision tree. The decision tree may have multiple conditions, or even sets of conditions, to evaluate polarity scores of individual lines of code, code snippets, clusters, and even the overall code itself. The rules or conditions may be score based (numerical value), polarity/sign based, command based, cluster based, vulnerability based, etc., or based on any combination thereof. For example, an individual polarity score of 0.5 may indicate positivity, while a score of −2 for the overall code may indicate a slightly negative total score, as the total score is affected by all of the lines of code. Accordingly, the rules or conditions may have different values for code remediation and for selecting which code is viable as replacement code. As another example, for a first command or line of code, different thresholds may be used than for a second command or line of code. Thus, the decision tree, such as the individual rules or conditions thereof, may be dependent on one or more factors (e.g., features) and determined or updated based on AI or ML techniques as described herein.

In a particular implementation, a system (e.g., 100) for automated action recommendation for automated source code analysis is disclosed. The system includes a memory (e.g., 106) and one or more processors (e.g., 104) communicatively coupled to the memory. The one or more processors are configured to obtain code data (e.g., 160) corresponding to an in-development software code or potentially vulnerable software code. The code data includes parameters (e.g., 162) of one or more data entities corresponding to lines of source code and/or code statements. The one or more processors are also configured to provide at least some of multiple features (e.g., 110) extracted from the code data as input data to one or more ML models (e.g., 126) to assign the data entities to an assigned cluster of multiple clusters (e.g., represented by 112). The one or more ML models are configured to assign input feature sets to the multiple clusters based on relationships between the input feature sets and features of members of the multiple clusters. The one or more processors are configured to generate at least one recommended remediation action (e.g., 170) based on multiple data entities or sequences thereof that correspond to the assigned cluster and based on a polarity score (with magnitude) derived from the code data. Each remediation action may include one or more actions to be performed to remediate the software source code to remove vulnerabilities and make the software code compliant. The one or more processors are further configured to output the at least one recommended remediation action.

As described above, the system 100 supports sentiment analysis using magnitude of entities that provides benefits compared to conventional automated or manual code analysis. For example, by performing sentiment analysis using magnitude of entities, automated code analysis can account for sentiment. That is, conventional sentiment analysis can be performed on code as opposed to just text and then the code based sentiment analysis can be further modified to account for magnitude. Such processes may generate a dictionary or codebook that indicates or identifies vulnerable lines of code and may also identify vulnerable applications in general. The dictionary or codebook can be distributed and used on other devices to help identify and/or fix vulnerable or non-compliant lines of code during the development process, such as while the developer is typing a line of code. Accordingly, compliant code development is baked into the development process at the very beginning of the software development process, thus making it securable.

Figure 2:
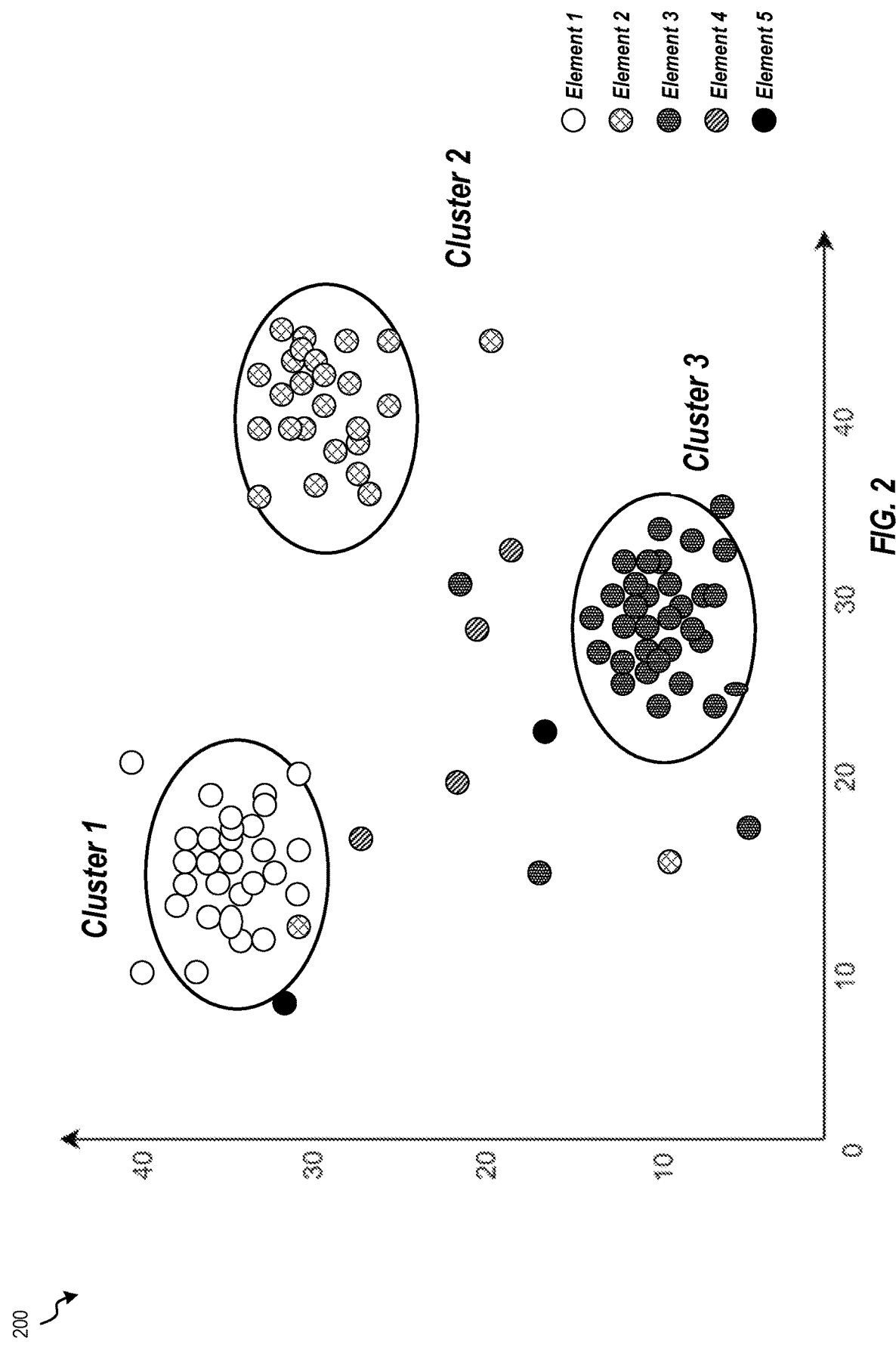
FIG. 2 illustrates a graph diagram of an example of a clustering data entities according to one or more aspects.

FIG. 2 illustrates an exemplary clustering diagram for data elements of application source code. In FIG. 2, a clustering diagram 200 is illustrated which depicts three data element clusters (k), a first cluster 202, a second cluster 204, and a third cluster 206, and five types of data elements, Elements 1-5. The first cluster 202 corresponds to a first cluster of data elements. The second cluster 204 corresponds to a second cluster of data elements. The third cluster 206 corresponds to a third cluster of data elements.

A data element (or data entity) may include or correspond to a single statement or single line of code. For example, a data element may include or correspond to one of the examples data elements (e.g., lines of code) of FIG. 3. To illustrate, an individual data element may include or correspond to a single statement or line that ends with a coding punctuation (e.g., semicolon).

A cluster of data elements includes or corresponds to a grouping of similar data elements, such as data elements with one or more similar characteristics. In examples where the data elements are lines of code or code snippets, the similar characteristics may include similar commands, similar variables, similar patterns of items, etc. In some implementations, each data element (every line of code) with similar characteristics is captured in every individual cluster.

As depicted in the example of FIG. 2, the first cluster 202 includes multiple type of data elements, such as a multiple first type data elements (Element 1) and at least one other type data element (e.g., a second type of data element (Element 2)). In the example of FIG. 2, the second cluster 204 includes a single type of data element, the second type of data element. The third cluster 206 includes a single type of data element, a third type of data element (Element 3).

Clustering may include or correspond to a type of similarity analysis or a form of affinity analysis according to one or more aspects. In some implementations, one or more variance plots may be used for one or more parameters/features of the code. The affinity analysis may be performed to determine which features have high variance with respect to various patterns (e.g., code or code sequences) indicated by historical code data (e.g., historical source code data with known vulnerabilities or known cleanliness/lack of vulnerabilities). High variance is associated with different tracked patterns being well distributed between multiple different values for the first particular parameter, while in low variance different tracked patterns are mostly distributed to a single value of the second particular parameter. If the variance for a first particular parameter fails to satisfy a threshold and the variance for a second particular parameter satisfies the threshold, the second particular parameter may be identified as a principal feature and the first particular parameter may be identified as not being a principal feature. In such an example, the second particular parameter may be discarded during feature reduction to focus the recommendation processes described herein on features that have a larger effect on selection of code or code sequences (e.g., patterns). In some implementations, vectorization clustering is used.

FIG. 3 is a diagram 300 illustrating example compliant and non-compliant code statements. In FIG. 3, multiple compliant and non-compliant data element (e.g., statements/lines of code) are provided for the Java programming language. In the example of FIG. 3, compliant data elements are given a "positive score" and correspond to secure statements or lines of code. For example, using a cipher or a particular cipher may be considered or determined to be secure and/or compliant based on known code security/vulnerability databases. Additionally, or alternatively, using another particular cipher or not using a cipher at all may be considered or determined to be insecure and/or non-compliant, having one or more known vulnerabilities or determined vulnerabilities.

For example, when encoding using a certain type of cryptography (e.g., SHA-256) may be considered or determined to be secure and/or compliant. As another example, another type of cryptography (SHA-1) may be considered or determined to be insecure and/or non-compliant. As yet another example, generating random variables securely (e.g., securerandom) may be considered or determined to be secure and/or compliant. Alternatively, refraining from using secure generation or using insecure or normal variable retrieve or generation may be considered or determined to be insecure and/or non-compliant. In some implementations, the example code statements in FIG. 3 may first be determined to be known good or bad statements for particular vulnerabilities indicated in vulnerabilities databases. Additional, raw code may also include one or more of these statements and may be evaluated based on their contribution to multiple vulnerabilities.

FIG. 4A is a diagram 400 of an example of code processing or preprocessing, such as preprocessing for clustering and analysis. In order to get the context of orientation, of every statement, every line of code, may be saved in a data structure having a row for each line of code and multiple columns for adjacent lines of code. In the example of FIG. 4A, a table has three columns of PLC (Previous Line of Code), CLC (Current Line of Code), ULC (Upcoming Line of Code) for each line of code as illustrated in FIG. 4A. That is, the table has multiple rows (n+1+a) each corresponding to a line of code, where each row is arranged such that the current line of code (which may correspond to a data element of observation) is in the middle column with previous and upcoming lines of code next to it in the other columns. Although the table in FIG. 4A has three columns, in other implementations, the table may have two columns or more than three columns. For example, in some implementations only previous lines of code may be used. As another example, in other implementations, multiple future lines of code may be used.

FIG. 4B is another diagram 410 of a detailed example of a table for contextual score generation. FIG. 4B is explained with reference to FIG. 5 and to evaluating a contextual scores for a particular data entity ("c. setSecure(true)"). Additionally, FIG. 4B also illustrates code after it has been preprocessed. For example, the lines of code do not include comments and the code has been cleaned to returns every individual statement (e.g., one full line of code that ends with a semi colon (;)) as one token. The table of diagram 410 has a first column of S. No (line number) denoting the running numbers for every row of code after it has been preprocessed or before evaluating a contextual score.

FIG. 5 is a diagram 500 of an example of cluster scoring. For example, FIG. 5 illustrates a diagram of a method of evaluating and scoring elements of a cluster of an application for generation of dictionaries used in sentiment analysis or for evaluating and scoring elements of a line of code or application (e.g., a cluster thereof) for automated analysis of source code.

In the example of FIG. 5, the diagram indicates how to score a cluster (k) of data elements, such as any of the clusters of FIG. 2. Scoring a cluster includes determining a frequency of a data element, an intensity of the data element, and a contextual score of the data element, and then determining a score (e.g., entity score) based on the frequency, the intensity, and the contextual score.

Determining the frequency of the data element includes determining a number of occurrences of the particular data element in the cluster and a total number of data elements of in the cluster. The frequency of the data element corresponds to the number of occurrences of particular data element divided by the total number of data elements. For example, in FIG. 4B there are three 5 instances of the data element/line of code/statement "c. setSecure(true)" and there are three instances of that particular data element where a second data element/line of code/statement "new Cookie (SECRET, secret);".

Determining the intensity of the data element includes determining a numerical value for the intensity based on the frequency. For example, the numerical value for the frequency is converted into a percentage, such as by multiplying by 100, and then a numerical intensity value is determined based on the percentage. As illustrated in FIG. 5, frequency percentages may be split into discrete groups and each group may be associated with an intensity value. The intensity value may be configured to amplify or increase the strength or magnitude (or any emotional behavior) of a line of code towards compliancy or non-compliancy. For example, a frequency percentage of 0 to 20% may correspond to an intensity value of 0.1 and a frequency percentage of 80 to 100% may correspond to an intensity value of 0.5.

Determining contextual score includes determining a numerical value for each data element of the cluster representing contextual information. In some implementations, contextual scores are determined for each data element prior to data element clustering.

Determining the contextual score may include determining a score based on code which comes before or after the code being analyzed. For example, a contextual score may be provided for each line of code. With reference to table 410 of FIG. 4B, each line of code may be placed into a table and associated with one or more previous lines of code, one or more future lines of code, or a combination thereof. As illustrated in the example of FIG. 4B, the table includes a row for each line of code. Each current line of code is represented in a middle column, where a previous line of code for the particular current code is represented in a first column for that row and a future line of code for the particular current code is represented in a third column for that row.

A contextual score may provide information on whether the code (and any associated compliancy or vulnerability) is occurring based on a single line of code or based on multiple lines of code. For example, if n−1 and n are always occurring close (e.g., next) to each other or are occurring close to each other in many places of our dataset means it may indicate that the codes/statements are contextually bonded to each other. A contextual score may be determined based on a strength of the link/bond. For example, the contextual score may be dependent based on a frequency of the combinations occurring, a distance between elements or lines of the combination, or both. For example, increased combinations of two lines of code may increase the contextual score. As another example, two statements that are closer together (e.g., next to each other) may have a higher score than the two statements that are further apart (e.g., three lines of code away).

In some implementations, a contextual score may be conditional. For example, a contextual score may only be calculated based on satisfying a particular condition. To illustrate, a contextual score may be determined for matching entries (e.g., combinations of CLC and PLC, CLC and FLC, or CLC, PLC, and FLC) that meet a particular frequency condition, such as more than one occurrence.

Additionally, or alternatively, multiple contextual scores may be determined for each line of code. For example, a historical contextual score may be determined which only takes into account previous lines of a code, a future contextual score may be determined which only takes into account future lines of code, or an adjacent (or agnostic) contextual score may be determined which takes into account future and/or previous lines of code.

As an illustrative example, how many times a particular combination (e.g. n−1 and n combinations) of elements or lines are occurring together may be captured in a matching entries database. The matching entries database may include information on counts of combinations, such as 'PLC Count'=1, when n−1 and n combinations are getting repeated more than once (>1), else if only one entry is present then PLC Count=0, and 'ULC Count'=1, when n and n+1 combinations are getting repeated more than once (>1), else if only one entry is present then ULC Count=0.

For the above case, a cluster may have a data element for the line of code or code snippet of c. setSecure(true). As indicated in table 410 of FIG. 4B, the data element has repeating combinations of previous lines of code and/or future lines of code. A contextual analyzer may determine a contextual score for the data element for each repeating combination of the data element and another statement. This contextual score may be applied for each line of code where the combination is repeated.

In some implementations, in the contextual score calculation, the frequency for the repeating combination may be taken against the number of occurrences of the data element. Thus, in the example of table 410, the statement "new Cookie (SECRET, secret);" appears before the data element (c. setSecure(true)) three times for the five times the data element appears in the cluster. Thus, the frequency may be calculated as ⅗ or 60 percent. The contextual score may include or correspond to a product of the contextual or co-occurrence frequency and a context multiplier (e.g., 25%).

In other implementations, in the contextual score calculation, the frequency for the repeating combination may be taken against the number of lines in the cluster. Thus, in the example of table 410, new Cookie (SECRET, secret); appears before the data element three times for the 10 lines of code in the cluster. Thus, the frequency may be calculated as 3/10 or 30 percent. The contextual score may include or correspond to a product of the contextual or co-occurrence frequency and a context multiplier (e.g., 25%). By using additional lines of code, the contextual score can inform that system 100 and any users thereof of issues which are caused by multiple lines of code.

Figure 6:
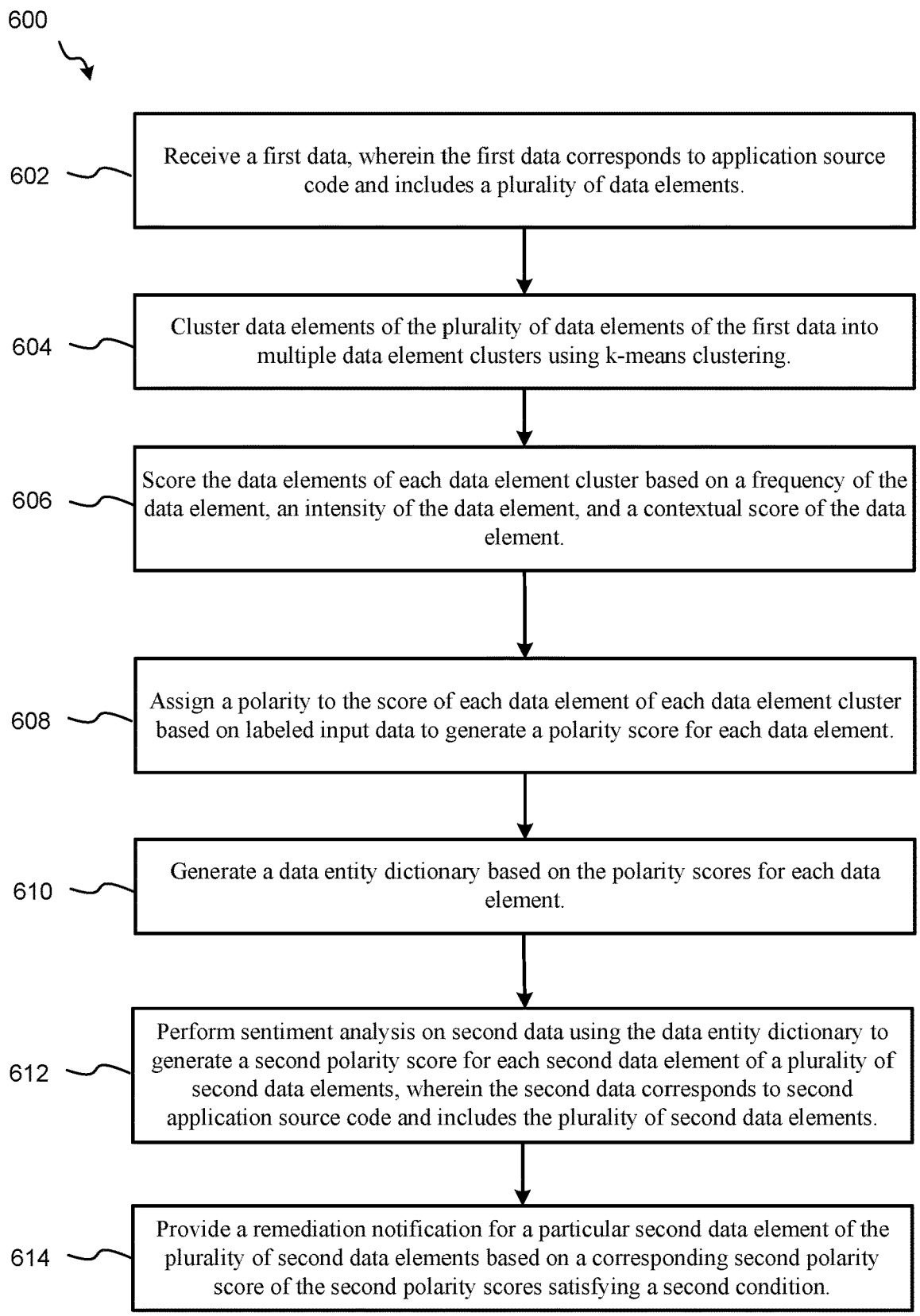
FIG. 6 is a flow diagram illustrating an example of a method for automated source code review using sentiment analysis with magnitude of entities according to one or more aspects.

Referring to FIG. 6, a flow diagram of an example of a method for sentiment analysis using magnitude of data elements (or data entities) according to one or more aspects is shown as a method 600. In some implementations, the operations of the method 600 may be stored as instructions that, when executed by one or more processors (e.g., the one or more processors of a computing device or a server), cause the one or more processors to perform the operations of the method 600. In some implementations, the method 600 may be performed by a computing device, such as the server 102 of FIG. 1 (e.g., a computing device configured for sentiment analysis using magnitude of entities), the client device 150 of FIG. 1, or a combination thereof.

The method 600 includes receiving first data, wherein the first data corresponds to application source code and includes a plurality of data elements, at 602. For example, the first data may include or correspond to the code data 160 and/or the historical code data 180 of FIG. 1. As another example, the first data may include or correspond to pre-processed data. An individual statement may correspond to a single full line of code that ends with a semi colon, as illustrated in FIGS. 2-5.

The method 600 clustering, by the one or more processors, data elements of the plurality of data elements of the first data into multiple data element clusters using k-means clustering, at 604. For example, the data elements may include or correspond to the extracted feature 110 of FIG. 1, and the data element clusters may include or correspond to the data element clusters of the cluster data 112 of FIG. 1. For example, the cluster engine 124 of FIG. 1 may generate cluster data 112 based on the code data 160 and/or the historical code data 180. The cluster data includes or indicates clusters of data elements (every line of code) having groups of data elements with similar characteristics as illustrated in FIG. 2.

The clustering may cluster the data elements, individual lines of code, such as one or more statements ending or separated by a character (e.g., semicolon) or by portions or pieces of a line of code, such as snippets. The clustering may be a type of clustering that uses or accounts for duplicates. Using duplicates enables better contextual scores and generation of a score for each line of code. The clustering may determine a distance of between similar data elements, such as a Euclidean distance. The clustering may be unsupervised and determine a number of clusters (K) based on the Elbow method. In some implementations, a device may preprocess the first data prior to clustering. Preprocessing may include performing NLP, converting programing languages, cleaning the first data by removing comments and return individual statements as a separate token, etc.

The method 600 includes scoring, by the one or more processors, the data elements of each data element cluster based on a frequency of the data element, an intensity of the data element, and a contextual score of the data element, at 606. For example, the scores for the data elements may include or correspond to the data entity data 115 (e.g., data entity scores) of FIG. 1. The frequency of the data element, the intensity of the data element, and the contextual score may be determined as described with reference to FIGS. 1-5.

The frequency of a data element may indicate how many times a line of code is getting repeated in a cluster. For example, the frequency of the data element may be a number of times a particular data element appears in a data cluster divided by a number of total entries (data elements) in the data cluster.

The intensity of a data element may be dependent on the frequency of the data elements, thus amplifying or increasing the strength or magnitude (or emotional behavior) of a line of code leading towards compliancy or non-compliancy. For example, if the occurrence of any data element is greater than a threshold amount, then we assign a value of strength to every data element. The strength may be determined based on a function or table, such as the table of FIG. 5.

The contextual score may be calculated for every data element and may correspond to a co-occurrence score that takes into account the occurrence of patterns of multiple lines of code. The contextual score can represent patterns of two of more lines of code that appear in adjacent lines of code or within a certain distance.

The method 600 includes assigning, by the one or more processors, a polarity to the score of each data element of each data element cluster based on labeled input data to generate a polarity score for each data element, at 608. For example, the polarity scores may include or correspond to the polarity scores data 116 of FIG. 1.

The method 600 includes generating, by the one or more processors, a data entity dictionary based on the polarity scores for each data element, at 610. For example, the data entity dictionary may include or correspond to the data entity dictionary data 118 of FIG. 1.

The method 600 includes performing, by the one or more processors, sentiment analysis on second data using the data entity dictionary to generate a second polarity score for each second data element of a plurality of second data elements, wherein the second data corresponds to second application source code and includes the plurality of second data elements, at 612. For example, the polarity scores may include or correspond to the polarity scores data 116 of FIG. 1 for the code data 160. In some implementations, a device may perform sentiment analysis over a new set of data using the generated data entity dictionary to generate respective polarity scores for each new data element of a plurality of new data elements. The new set of data may include or correspond to any new application source code and includes the plurality of new data elements.

The method 600 includes providing, by the one or more processors, a remediation notification for a particular second data element of the plurality of second data elements based on a corresponding second polarity score of the second polarity scores satisfying a condition, at 614. For example, the remediation notification may include or correspond to the GUI 172, the instructions 174, or both of the recommend code or sequence 170 of FIG. 1. In some implementations, when a negative element is found based upon the calculated polarity score, the method may provide a remediation notification for a particular data element in the new application source code. Although described herein as satisfying a condition, in other implementations a remediation or other action may be implemented based on not satisfying a condition. For example, when the polarity score indicates a negative score or strength the score may not satisfy a condition (e.g., have a neutral or positive score or strength) and a remediation action may be taken. Different conditions may be associated with different actions and/or data entities sizes. For example, different conditions may be associated with generating a notification for review of a line of code versus performing automatic code correction. In some such implementations, a separate condition may be used to identify, from a group of candidate lines of code, a corrected line of code to use for a particular line of code with an identified vulnerability. Additionally or alternatively, different conditions may be associated with remediating a single line of code viruses a block of code or an entire software component or application.

In some implementations, the method 600 also includes, one or more operations. For example, the method 600 may include one or more steps or operations as described with reference to FIGS. 1-5. As another example, the method 600 may include one or more aspects as described below.

In a first aspect, scoring the data elements of each data element cluster includes: generating a data entity score for each data element of the data element cluster.

In a second aspect, alone or in combination with one or more of the above aspects, generating the data entity score for each data element of the data element cluster includes: generating a frequency score, an intensity score, and a contextual score for each data element of the data element cluster.

In a third aspect, alone or in combination with one or more of the above aspects, generating the frequency score for each data element of the data element cluster includes: determining a frequency of the data element in the data element cluster as a frequency score for the data element, wherein the frequency scores for the data elements correspond to a number of occurrences of the data element in the data element cluster divided by the number of data elements in the data element cluster.

In a fourth aspect, alone or in combination with one or more of the above aspects, generating the intensity score for each data element of the data element cluster includes: assigning the intensity score from a table of intensity scores based on the frequency of the data element in the data element cluster, wherein the table of intensity scores range from 0 to 0.5.

Additionally, or alternatively, generating the intensity score for each data element of the data element cluster includes amplifying a magnitude of a data element based on the frequency of the data element in the data element cluster.

In a fifth aspect, alone or in combination with one or more of the above aspects, generating the contextual score for each data element of the data element cluster includes: determining a co-occurrence frequency of the data element and at least one other data element in the data element cluster.

In a sixth aspect, alone or in combination with one or more of the above aspects, the data element corresponds to a current line of code and wherein the at least one other data element corresponds to an adjacent line of code.

In a seventh aspect, alone or in combination with one or more of the above aspects, the data elements correspond to lines of code, and wherein the remediation notification corresponds to a user prompt to fix a particular line of code of the lines of code.

In an eighth aspect, alone or in combination with one or more of the above aspects, the remediation notification includes a suggested replacement line of code for the particular line of code.

In a ninth aspect, alone or in combination with one or more of the above aspects, the method further includes: generating, by the one or more processors, an overall score for the second data based on a sum of the second polarity scores; and determining whether the overall score satisfies a second condition, wherein the remediation notification is provided further based on the overall score satisfying the second condition. Alternatively, the remediation notification is provided further based on the overall score not satisfying the second condition i.e., when the polarity score appears with negative strength.

In a tenth aspect, alone or in combination with one or more of the above aspects, the method further includes, prior to clustering: preprocessing input source code data to generate the first data.

In an eleventh aspect, alone or in combination with one or more of the above aspects, wherein preprocessing the first data includes: cleaning the input source code data, by removing comments and returning individual statements as a separate token.

In a twelfth aspect, alone or in combination with one or more of the above aspects, preprocessing the first data includes: natural language processing (NLP) to extract a plurality of lines of code included in the input source code data; or natural language processing (NLP) on the input source code data to parse a programming language of the input source code data.

In a thirteenth aspect, alone or in combination with one or more of the above aspects, performing the k-means clustering includes: performing an elbow method to calculate a number of clusters (K); and determining Euclidean distance for data elements calculated from a centroid for each cluster.

In a fourteenth aspect, alone or in combination with one or more of the above aspects, the data entity dictionary includes a compliant data entity dictionary and a non-compliant data entity dictionary, and the further includes: generating the compliant data entity dictionary based on polarity scores from processing a compliant code data set; and generating the non-compliant data entity dictionary based on polarity scores from processing a non-compliant code data set, wherein assigning the polarity to generate the polarity score for each data element includes: applying a negative polarity to a particular score for a particular data element based on the data element being in the non-compliant data entity dictionary.

In a fifteenth aspect, alone or in combination with one or more of the above aspects, the method further includes: performing, by the one or more processors, sentiment analysis on third data using the data entity dictionary to generate a third polarity score for each third data element of the third data; and providing, by the one or more processors, a second remediation notification for a particular third data element based on a corresponding third polarity score of the third polarity scores satisfying a third condition.

In a sixteenth aspect, alone or in combination with one or more of the above aspects, the method further includes: identifying compliant statements of the first data based on the polarity scores; identifying non-compliant statements of the first data based on the polarity scores; or both.

In a seventeenth aspect, alone or in combination with one or more of the above aspects, the method further includes: updating a AI or ML model based on the compliant statements, the non-compliant statements, or both; updating the data entity dictionary based on the compliant statements, the non-compliant statements, or both; or both.

In an eighteenth aspect, alone or in combination with one or more of the above aspects, the method further includes, prior to providing the remediation notification: generating, by the one or more processors, an overall score for the second data based on a sum of the second polarity scores; determining whether the overall score satisfies a second condition; and determining to perform code remediation based on the overall score satisfying the second condition, wherein performing code remediation includes providing the remediation notification.

In an additional aspects a method for sentiment analysis using magnitude of data elements includes: receiving, by one or more processors, a first data, wherein the first data corresponds to application source code and includes a plurality of data elements; clustering, by the one or more processors, data elements of the plurality of data elements of the first data into multiple data element clusters using a clustering algorithm; scoring, by the one or more processors, the data elements of each data element cluster based on a frequency of the data element, an intensity of the data element, and a contextual score of the data element; assigning, by the one or more processors, a polarity to the score of each data element of each data element cluster based on labeled input data to generate a polarity score for each data element; generate, by the one or more processors, a data entity dictionary based on the polarity scores for the data elements; and transmit, by the one or more processors, the data entity dictionary to another device for use in sentiment analysis for automated source code review.

In an additional aspect, a method for sentiment analysis using magnitude of data elements includes: receiving, by one or more processors, a data entity dictionary based on first polarity scores for input compliant data elements and input non-compliant data elements; performing, by the one or more processors, sentiment analysis on first data using the data entity dictionary to generate a second polarity score for each first data element of a plurality of first data elements, wherein the first data corresponds to unlabeled application source code and includes the plurality of first data elements; and providing, by the one or more processors, a remediation notification or implementing a remediation action for a particular first data element of the first data elements based on a corresponding polarity score of the second polarity scores satisfying a condition.

It is noted that other types of devices and functionality may be provided according to aspects of the present disclosure and discussion of specific devices and functionality herein have been provided for purposes of illustration, rather than by way of limitation. It is noted that the operations of the method 600 of FIG. 6 may be performed in any order, or that operations of one method may be performed during performance of another method, such as the method 600 of FIG. 6 including one or more operations of the system 100 of FIG. 1. It is also noted that the method 600 of FIG. 6 may also include other functionality or operations consistent with the description of the operations of the system 100 of FIG. 1.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for sentiment analysis using magnitude of a plurality of data elements, the method comprising: receiving, by one or more processors of a server provided in a distributed system using multiple servers in a cloud-based environment, a first data via a network, wherein the first data corresponds to application source code and includes the plurality of data elements;
   clustering, by the one or more processors, in real time, data elements of the plurality of data elements of the first data into multiple data element clusters using a clustering machine learning model, the clustering machine learning model having been trained using unsupervised learning to cluster input feature sets into the multiple data element clusters based on underlying relationships between the input feature sets and the multiple data element clusters, the input feature sets being extracted features from historical code data representing compliant code and non-compliant code;
   generating a score of, by the one or more processors, each data element of each data element cluster of the multiple data element clusters based on a frequency of a respective data element of a respective cluster of the multiple data element clusters, an intensity of the respective data element, and a contextual score of the respective data element;
   assigning, by the one or more processors, a polarity to the score of each data element of each data element cluster based on labeled input data to generate a polarity score for each data element;
   generating, by the one or more processors, a data entity dictionary based on the polarity score for each data element, wherein the data entity dictionary includes a compliant data entity dictionary and a non-compliant data entity dictionary, and wherein generating the data entity dictionary comprising:
   generating the compliant data entity dictionary based on polarity scores from processing a compliant code data set; and
   generating the non-compliant data entity dictionary based on polarity scores from processing a non-compliant code data set;
   performing, by the one or more processors, sentiment analysis on second data using the data entity dictionary to generate a second polarity score for each second data element of a plurality of second data elements, wherein the second data corresponds to second application source code and includes the plurality of second data elements, and wherein generating the second polarity score for each second data element includes:
applying a negative polarity to generate a corresponding second polarity score for a particular second data element based on the particular second data element being in the non-compliant data entity dictionary; and
providing, by the one or more processors, a remediation notification in real time for the particular second data element of the plurality of second data elements based on the corresponding second polarity score of the particular second data element satisfying a condition, the particular second data element of the application source code including a security flaw and implementing a remediation action based on the remediation notification to fix the security flaw of the particular second data element.

2. The method of claim 1, wherein generating the score of each data element includes:
generating a data entity score for each data element of a data element cluster of the multiple data element clusters.

3. The method of claim 2, wherein generating the data entity score for each data element of the data element cluster includes:
generating a frequency score, an intensity score, and a contextual score for each data element of the data element cluster.

4. The method of claim 3, wherein generating the frequency score for each data element of the data element cluster includes:
determining a frequency of a data element in the data element cluster as a frequency score for the data element, wherein the frequency score for the data element correspond to a number of occurrences of the data element in the data element cluster divided by a number of data elements in the data element cluster.

5. The method of claim 4, wherein generating the intensity score for each data element of the data element cluster includes:
assigning an intensity score from a table of intensity scores based on the frequency of the data element in the data element cluster, wherein the table of intensity scores range from 0 to 0.5.

6. The method of claim 3, wherein generating the contextual score for each data element of the data element cluster includes:
determining a co-occurrence frequency of the data element and at least one other data element in the data element cluster.

7. The method of claim 6, wherein the data element corresponds to a current line of code and wherein the at least one other data element corresponds to an adjacent line of code.

8. The method of claim 1, wherein the plurality of data elements correspond to lines of code, and wherein the remediation notification corresponds to a user prompt to fix a particular line of code of the lines of code.

9. The method of claim 8, wherein the remediation notification includes a suggested replacement line of code for the particular line of code.

10. The method of claim 1, further comprising:
generating, by the one or more processors, an overall score for the second data based on a sum of the second polarity score for each second data element of the plurality of second data elements; and
determining whether the overall score satisfies a second condition, wherein the remediation notification is provided further based on the overall score satisfying the second condition.

11. The method of claim 1, further comprising, prior to clustering:
preprocessing input source code data of the first data to generate the preprocessed first data.

12. The method of claim 11, wherein preprocessing the first data includes:
cleaning the input source code data, by removing comments and returning individual statements as a separate token.

13. The method of claim 11, wherein preprocessing the first data includes:
natural language processing (NLP) to extract a plurality of lines of code included in the input source code data; or
natural language processing (NLP) on the input source code data to parse a programming language of the input source code data.

14. The method of claim 1, further comprising:
performing, by the one or more processors, sentiment analysis on third data using the data entity dictionary to generate a third polarity score for each third data element of the third data; and
providing, by the one or more processors, a second remediation notification for a particular third data element based on a corresponding third polarity score of the particular third data element satisfying a third condition.

15. The method of claim 1, further comprising:
identifying compliant statements of the first data based on the polarity score of each data element of the plurality of data elements;
identifying non-compliant statements of the first data based on the polarity score of each data element of the plurality of data elements; or both.

16. The method of claim 15, further comprising:
updating an artificial intelligence (AI) or machine learning (ML) model based on the compliant statements, the non-compliant statements, or both; and
updating the data entity dictionary based on the compliant statements, the non-compliant statements, or both.

17. The method of claim 1, further comprising, prior to providing the remediation notification:
generating, by the one or more processors, an overall score for the second data based on a sum of the second polarity score for each second data element of the plurality of second data elements;
determining whether the overall score satisfies a second condition; and
determining to perform code remediation based on the overall score satisfying the second condition, wherein performing code remediation includes providing the remediation notification.

18. A method for sentiment analysis using magnitude of a plurality of data elements, the method comprising:
receiving, by one or more processors of a server provided in a distributed system using multiple servers in a cloud-based environment, a first data via a network, wherein the first data corresponds to application source code and includes the plurality of data elements;
clustering, by the one or more processors, in real time, data elements of the plurality of data elements of the first data into multiple data element clusters using a clustering algorithm by a clustering machine learning model, wherein the clustering machine learning model having been trained using unsupervised learning to cluster input feature sets into the multiple data element clusters based on underlying relationships between the input feature sets and the multiple data element clusters, wherein the input feature sets being extracted features from historical code data representing compliant code and non-compliant code;

generating a score of, by the one or more processors, each data element of each data element cluster of the multiple data element clusters based on a frequency of a respective data element of a respective cluster of the multiple data element clusters, an intensity of the respective data element, and a contextual score of the respective data element;

assigning, by the one or more processors, a polarity to the score of each data element of each data element cluster based on labeled input data to generate a polarity score for each data element;

generating, by the one or more processor, a data entity dictionary based on the polarity score for each data element, wherein a data element corresponding to the polarity score satisfying a condition includes a security flaw, wherein the data entity dictionary includes a compliant data entity dictionary and a non-compliant data entity dictionary, and wherein generating the data entity dictionary comprising:

generating the compliant data entity dictionary based on polarity scores from processing a compliant code data set; and generating the non-compliant data entity dictionary based on polarity scores from processing a non-compliant code data set; and transmitting, by the one or more processors, the data entity dictionary to another device for use in sentiment analysis for automated source code review, wherein the another device apply a negative polarity to generate a second polarity score for a second data element based on the second data element being in the non-compliant data entity dictionary; and providing, by the one or more processors, a remediation notification in real time for the second data element of the plurality of second data elements based on the corresponding second polarity score of the second data element satisfying a condition, the second data element of the application source code including a security flaw and implementing a remediation action based on the remediation notification to fix the security flaw of the second data element.

19. A method for sentiment analysis using magnitude of a plurality of data elements, the method comprising:

receiving, by one or more processors of a server provided in a distributed system using multiple servers in a cloud-based environment, a data entity dictionary based on first polarity scores for input compliant data elements and input non-compliant data elements, wherein the data entity dictionary includes a compliant data entity dictionary and a non-compliant data entity dictionary, and wherein generating the data entity dictionary comprising:

generating the compliant data entity dictionary based on polarity scores from processing a compliant code data set; and generating the non-compliant data entity dictionary based on polarity scores from processing a non-compliant code data set, and wherein the first polarity scores for the input compliant data elements and the input non-compliant data elements is generated based on clustering the input compliant data elements and the input non-compliant data elements into multiple data element clusters using a clustering machine learning model, the clustering machine learning model having been trained using unsupervised learning to cluster input feature sets into the multiple data element clusters based on underlying relationships between the input feature sets and the multiple data element clusters, the input feature sets being extracted features from historical code data representing compliant code and non-compliant code;

performing, by the one or more processors, sentiment analysis on first data using the data entity dictionary to generate a second polarity score for each first data element of a plurality of first data elements, wherein the first data corresponds to unlabeled application source code and includes the plurality of first data elements, and wherein generating the second polarity score for each first data element includes:

applying a negative polarity to generate a corresponding second polarity score for a particular first data element based on the particular first data element being in the non-compliant data entity dictionary; and providing, by the one or more processors, a remediation notification for a particular first data element of the plurality of first data elements based on a corresponding polarity score of the particular first data element satisfying a condition, the particular first data element including a security flaw and implementing a remediation action based on the remediation notification to fix the security flaw of the particular first data element.

20. The method of claim 18, wherein clustering the data elements of the plurality of data elements of the first data comprises performing k-mean clustering, and wherein performing the k-means clustering includes:

performing an elbow method to calculate a number of clusters (K); and determining Euclidean distance for data elements calculated from a centroid for each cluster.

* * * * *